(12) United States Patent
Sumizawa et al.

(10) Patent No.: US 9,816,825 B2
(45) Date of Patent: Nov. 14, 2017

(54) NAVIGATION DEVICE AND METHOD OF SEARCHING ROUTE BY THE SAME

(75) Inventors: Akio Sumizawa, Kanagawa (JP); Arata Hayashi, Tokyo (JP); Hideo Fujiwara, Kanagawa (JP); Satoshi Kurihara, Kanagawa (JP)

(73) Assignee: Clarion Co., Ltd., Saitama-shi (JP)

( * ) Notice: Subject to any disclaimer, the term of this patent is extended or adjusted under 35 U.S.C. 154(b) by 933 days.

(21) Appl. No.: 13/519,165

(22) PCT Filed: Dec. 27, 2010

(86) PCT No.: PCT/JP2010/073616
§ 371 (c)(1),
(2), (4) Date: Sep. 24, 2012

(87) PCT Pub. No.: WO2011/081157
PCT Pub. Date: Jul. 7, 2011

(65) Prior Publication Data
US 2013/0013203 A1    Jan. 10, 2013

(30) Foreign Application Priority Data
Dec. 28, 2009 (JP) ................. 2009-298077

(51) Int. Cl.
G01C 21/34    (2006.01)
G01C 21/00    (2006.01)
G01C 21/36    (2006.01)

(52) U.S. Cl.
CPC ..... G01C 21/3453 (2013.01); G01C 21/3658 (2013.01)

(58) Field of Classification Search
CPC .................. G01C 21/00; G01C 21/34
(Continued)

(56) References Cited

U.S. PATENT DOCUMENTS 6,295,503 B1    9/2001  Inoue et al.
7,194,356 B2 *  3/2007  Sano ..................... 701/428
(Continued)

FOREIGN PATENT DOCUMENTS

JP    2000-131085 A    5/2000
JP    2001-183159 A    7/2001
(Continued)

OTHER PUBLICATIONS

Corresponding International Search Report with English Translation dated Feb. 1, 2011 (five (5) pages).
Form PCT/ISA/237 (four (4) pages).

*Primary Examiner* — Yonel Beaulieu
*Assistant Examiner* — Martin Weeks
(74) *Attorney, Agent, or Firm* — Crowell & Moring LLP (57) ABSTRACT

Provided are navigation technologies capable of preferentially guiding a vehicle to a route of a driving lane that can be available if given conditions are met. A navigation device is provided with a storage unit adapted to store lane information including the presence or absence of a driving lane that can be available if given conditions are met (hereinafter referred to as a conditional lane), a conditional-lane determining unit adapted to determine whether a vehicle equipped with the navigation device meets the conditions for driving in the conditional lane, and a route searching unit adapted to search a recommended route to a destination, wherein said route searching unit uses lane information to preferentially search for a route which utilizes a road including the conditional lane, when the conditional-lane determining unit determines that the aforementioned conditions are met.

10 Claims, 7 Drawing Sheets

(58) Field of Classification Search
USPC .................................................. 701/533, 410
See application file for complete search history.

(56) References Cited

U.S. PATENT DOCUMENTS

| | | |
|---|---|---|
| 2001/0021895 A1 | 9/2001 | Yamazaki |
| 2005/0071080 A1 | 3/2005 | Sano |
| 2009/0234577 A1* | 9/2009 | Rinscheid .................... 701/201 |
| 2010/0161207 A1* | 6/2010 | Do ............................... 701/200 |

FOREIGN PATENT DOCUMENTS

| | | | |
|---|---|---|---|
| JP | 2005-61988 A | | 3/2005 |
| JP | 2007086052 A | * | 4/2007 |
| JP | 2008101919 A | * | 5/2008 |
| JP | 2008-209422 A | | 9/2008 |
| JP | 2009-126418 A | | 6/2009 |
| JP | 2009-162740 A | | 7/2009 |

* cited by examiner

NAVIGATION DEVICE AND METHOD OF SEARCHING ROUTE BY THE SAME

TECHNICAL FIELD

The present invention relates to a technique for a navigation device. The present invention claims the priorities of Japanese Patent Application No. 2009-298077 filed on Dec. 28, 2009, whose contents are incorporated herein by reference as for the designated countries that permit it.

BACKGROUND ART

Conventionally, a navigation device employs a route guidance technique adapted for a traffic lane (such as a High-Occupancy Vehicles (HOV) lane) in which vehicles satisfying specific conditions are allowed to travel. Patent Document 1 describes a technique for such a navigation device. An HOV lane is also called a carpool lane.

Patent Document 1: Japanese Unexamined Patent Laid-Open No. 2000-131085

DISCLOSURE OF THE INVENTION

The above-mentioned navigation device is one that performs a route search including an HOV lane as an object of the route search, and sometimes retrieves a route that does not pass the HOV lane and performs guidance along that route, even though the user has the will to travel preferentially in the HOV lane and the conditions required for traveling are actually satisfied.

An object of the present invention is to provide a navigation technique that can perform guidance along a route giving priority to traveling in a lane that becomes available for traveling when prescribed conditions are satisfied, in the case where those prescribed conditions are satisfied.

To solve the above problem, the present invention provides a navigation device, comprising: a storage unit adapted to store lane information including information on a setting-up state of a lane (hereinafter, referred to as conditional lane) that is available for traveling when prescribed conditions are satisfied; a conditional-lane traveling possibility judgment unit adapted to judge whether a vehicle mounted with the navigation device satisfies the conditions for traveling in the conditional lane; and a route search unit adapted to search for a recommended route to a destination; and when the conditional-lane traveling possibility judgment unit judges that the conditions are satisfied, the route search unit uses the lane information to search for a route using preferentially a road including the conditional lane.

Further, the present invention provides a method of route search of a navigation device, comprising: a storage unit adapted to store lane information including information on a setting-up state of a lane (hereinafter, referred to as conditional lane) that is available for traveling when prescribed conditions are satisfied; and a route search unit adapted to search for a recommended route to a destination; and the method of route search carries out: a conditional-lane traveling possibility judgment step, in which it is judged whether a vehicle mounted with the navigation device satisfies the conditions for traveling in the conditional lane; and a search step, in which when it is judged in the conditional-lane traveling possibility judgment step that the conditions are satisfied, the lane information is used to search for a route using preferentially a road including the conditional lane.

According to the present invention, it is possible to perform guidance along a route giving priority to traveling in a lane that becomes available for traveling when prescribed conditions are satisfied, in the case where those prescribed conditions are satisfied.

BEST MODE FOR CARRYING OUT THE INVENTION

Now, a navigation device to which a first embodiment of the present invention is applied will be described referring to drawings.

Figure 1:
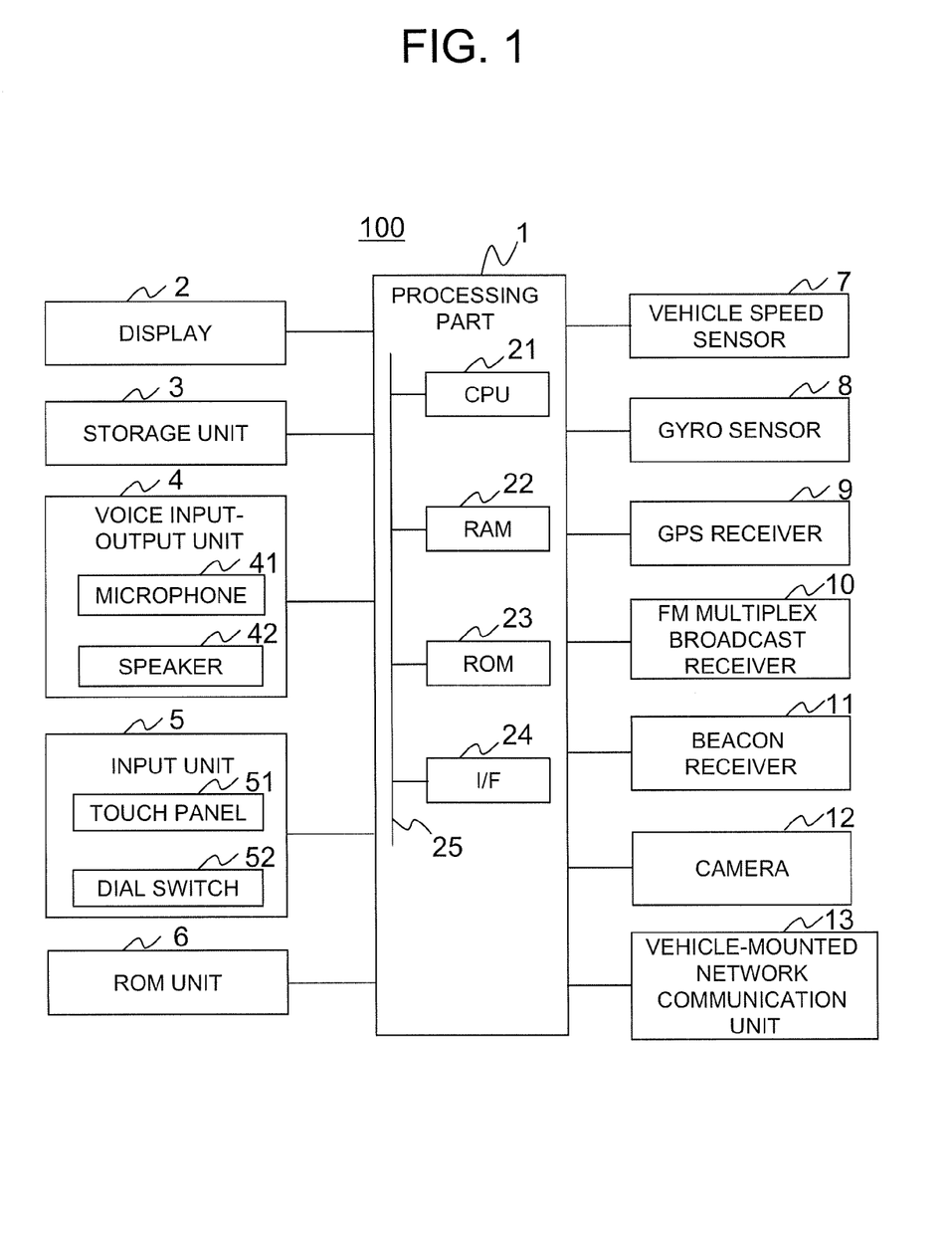
FIG. 1 is a schematic block diagram showing a navigation device.

FIG. 1 is a diagram showing a general configuration of a navigation device 100. As a so-called navigation device, the navigation device 100 can display map information to indicate a point denoting the current location of the navigation device 100 and information for guidance along a route to an already-set destination.

The navigation device 100 comprises a processing part 1, a display 2, a storage unit 3, a voice input-output unit 4 (having a microphone 41 as a voice input unit and a speaker 42 as a voice output unit), an input unit 5, a ROM unit 6, a vehicle speed sensor 7, a gyro sensor 8, a Global Positioning System (GPS) receiver 9, an FM multiplex broadcast receiver 10, a beacon receiver 11, a camera 12, and a vehicle-mounted network communication unit 13.

The processing part 1 is a central unit that performs various types of processing. For example, the processing part 1 calculates a current location on the basis of information outputted from the various types of sensors 7, 8, the GPS receiver 9, the FM multiplex broadcast receiver 10 and the like. Further, based on the obtained current location information, the processing part 1 reads out map data required for display from the storage unit 3 or the ROM unit 6.

Further, the processing part 1 expands the read map data into graphics, superimposes a mark denoting the current location on the graphics, and displays the resultant graphics on the display 2. Further, by using map data and the like stored in the storage unit 3 or the ROM unit 6, the processing part 1 searches for the optimum route (recommended route) connecting a departure place designated by the user or the current location to a destination (or a way point or a stopover point). Further, the processing part 1 guides the user by using the speaker 42 and/or the display 2.

Further, as described below, the processing part 1 can give priority to a route that uses a High-Occupancy Vehicles (HOV) lane for traveling in the course of route guidance. An HOV lane is a lane for which it is prescribed that only a vehicle carrying at least a prescribed number of passengers (for example, two including a driver) or a vehicle satisfying specific criteria (such as fuel efficiency standards or low-pollution criteria) can travel in it.

The processing part 1 of the navigation device 100 is constructed by connecting component devices through a bus 25. The processing part 1 comprises: a Central Processing Unit (CPU) 21, which executes various types of processing such as numerical operation and control of each component device; a Random Access Memory (RAM) 22 for storing map data, operation data and the like read from the storage unit 3; a Read Only Memory (ROM) 23 for storing programs and data; and an interface (I/F) 24 for connecting various hardware units with the processing part 1.

The display 2 is a unit for displaying graphics information generated by the processing part 1 or the like. The display 2 comprises a liquid crystal display, an organic EL display, or the like.

The storage unit 3 comprises a storage medium that is at least readable-writable, such as a Hard Disk Drive (HDD), a nonvolatile memory card, or the like.

This storage medium stores a link table 200, i.e. map data (including link data on links as components of each road on a map) required for an ordinary route search device.

Figure 2:
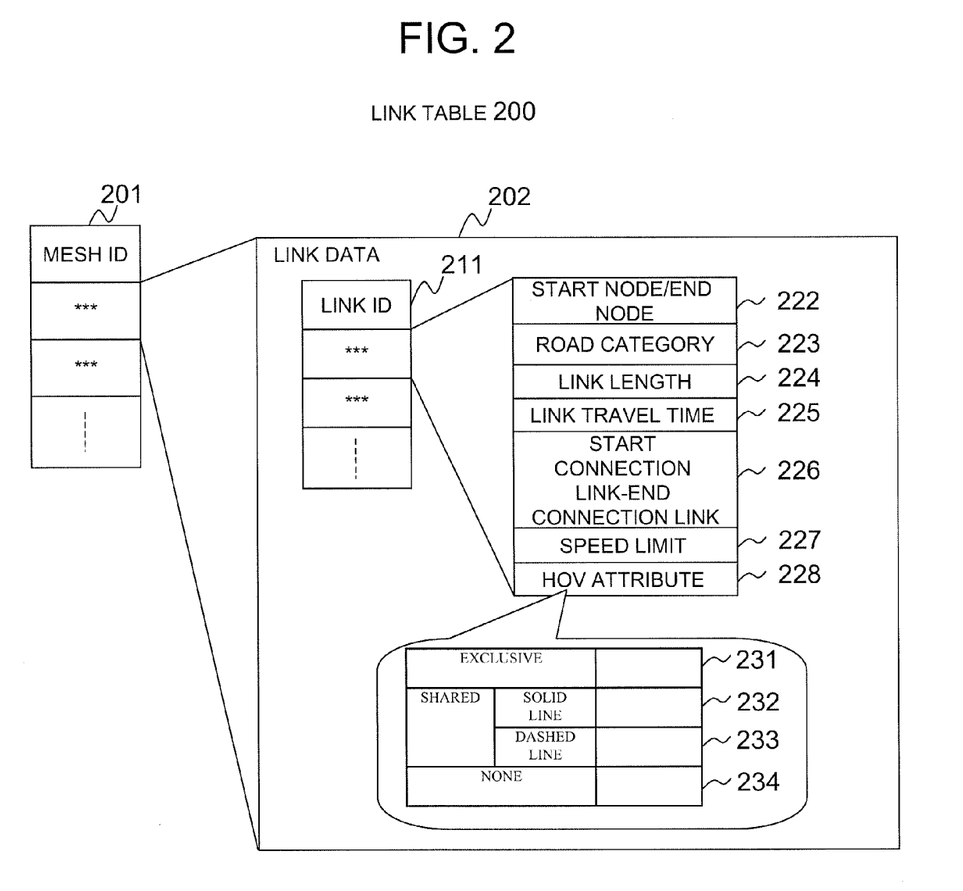
FIG. 2 is a diagram showing structure of a link table.

FIG. 2 is a diagram showing structure of the link table 200. For each identification code (a mesh ID) 201 of a mesh as a compartment area on a map, the link table 200 contains link data 202 for each of links constituting the roads included in the mesh area.

For each link ID 211 as an identifier of a link, the link data 202 includes: coordinate information 222 of two nodes (a start node and an end node) constituting the link; a road category 223, which indicates a category of the road including the link in question; a link length 224, which indicates the length of the link; a link travel time 225 stored previously; a start connection link-end connection link 226, which specifies a start connection link as a link connecting to the start node of the link in question and an end connection link as a link connecting to the end node of the link in question; a speed limit 227, which indicates a speed limit of the road including the link in question; an HOV attribute 228, which specifies an attribute concerning a state of setting-up of an HOV lane for the link; and the like.

As the HOV attribute 228, the link in question has a "exclusive" attribute 231 when the link consists of HOV lanes only: and a "none" attribute 234 when the link is a road that is not provided with an HOV lane. Further, when the link in question is a road having both an HOV lane and an ordinary lane and a lane change between an HOV lane and an ordinary lane is prohibited at that link, the link has a "shared-solid line" attribute 232. And, when the link in question is a road having both an HOV lane and an ordinary lane and a lane change between an HOV lane and an ordinary lane is permitted at that link, the link has a "shared-dashed line" attribute 233. Thus, it is said that the HOV attribute 228 stores information specifying a state of setting-up of an HOV lane.

Here, the two nodes constituting a link are distinguished as a start node and an end node, so that the upbound direction and the downbound direction of the same road are managed as different links from each other.

Description will be given returning to FIG. 1. The voice input-output unit 4 comprises the microphone 41 as a voice input unit and the speaker 42 as a voice output unit. The microphone 41 obtains sound outside the navigation device 100, such as voice coming from the user or another passenger.

The speaker 42 outputs, as voice, a message that is generated for the user by the processing part 1. The microphone 41 and the speaker 42 are placed separately at predefined positions of a vehicle. However, they may be housed in an integral case. The navigation device 100 can be provided with a plurality of microphones 41 and/or a plurality of speakers 42.

The input unit 5 is a device for receiving an instruction from the user through operation of the user. The input unit 5 comprises a touch panel 51, a dial switch 52, a scroll key as another hard switch (not shown), a scale change key, and the like. Further, the input unit 5 includes a remote control that can remotely give an operating instruction to the navigation device 100. The remote control is provided with a dial switch, a scroll key, a scale change key and the like, and can send information on operation of each key or switch to the navigation device 100.

The touch panel 51 is mounted on the display surface side of the display 2, and it is possible to see the display screen through the touch panel 51. The touch panel 51 specifies a touched position in relation to the X-Y coordinate of an image displayed on the display 2, converts the position into a coordinate, and outputs the obtained coordinate. The touch panel 51 comprises pressure-sensitive type or electrostatic type input detection elements or the like.

The dial switch 52 is constructed so as to be rotatable clockwise and counterclockwise, generates a pulse signal for each rotation of a prescribed angle, and outputs the generated pulse signals to the processing part 1. The processing part 1 obtains the angle of rotation on the basis of the number of the pulse signals.

The ROM unit 6 comprises a storage medium that is at least readable such as a Read-Only Memory (ROM) (such as a CD-ROM or a DVD-ROM) or an Integrated Circuit (IC) card. Such a storage medium stores moving image data or voice data, for example.

The vehicle speed sensor 7, the gyro sensor 8 and the GPS receiver 9 are used for the navigation device 100 to detect the current location (i.e. the location of the vehicle itself). The vehicle speed sensor 7 is a sensor that outputs a value used for calculating the vehicle speed. The gyro sensor 8 comprises an optical-fiber gyroscope, a vibrational gyroscope, or the like, and detects an angular velocity due to turning of a moving body. The GPS receiver 9 receives signals from GPS satellites and measures a distance between a moving body and each GPS satellite and a rate of change of that distance with respect to three or more satellites, in order to measure the current location, the traveling speed and a traveling direction of the moving body.

The FM multiplex broadcast receiver 10 receives an FM multiplex broadcast signal sent from an FM broadcast station. As FM multiplex broadcast, general current-state traffic information, traffic regulation information, Service Area/Parking Area (SA/PA) information, parking lot information, weather information and the like of Vehicle Information Communication System (VICS, a registered trademark) information, and text information provided as FM multiplex general information from a radio station can be received.

The beacon receiver 11 receives general current-state traffic information, traffic regulation information, Service Area/Parking Area (SA/PA) information, parking lot information, weather information, emergency information and the like of, for example, VICS information. For example, an optical beacon receiver using light-wave communication or a radio beacon receiver using radio wave can be mentioned as the beacon receiver.

Figure 3:
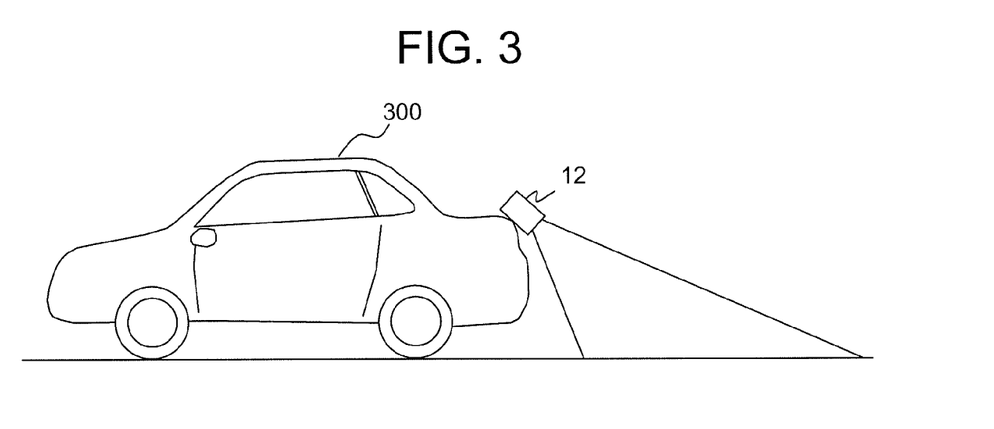
FIG. 3 is a view showing a mounting position of a camera.

FIG. 3 shows the camera 12 attached on the back of a vehicle 300. The camera 12 is slanted downward in some degree to take an image of the ground surface posterior to the vehicle, by using an image pickup device such as a Charge Coupled Device (CCD) image sensor or a Complementary Metal Oxide Semiconductor (CMOS) image sensor. Further, there is no limit to the position at which the camera 12 is attached. For example, the camera 12 can be attached on the front part of the vehicle 300 to take an image of the ground surface ahead of the vehicle.

Figure 4:
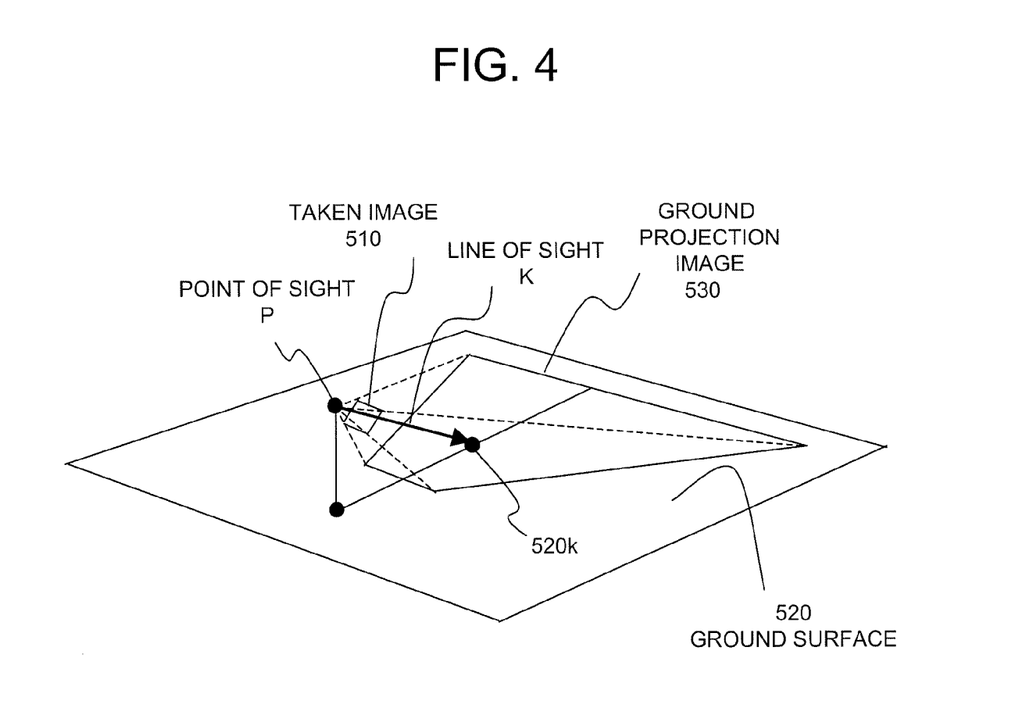
FIG. 4 is a view showing a state in which a taken image is projected on the ground surface.

FIG. 4 is a view for explaining a method of generating a ground projection image (i.e. an image obtained by projection on the ground) by using an image taken by the camera 12 of FIG. 3. The below-mentioned camera control part 104 obtains the position (a coordinate position in a 3D space with its origin at a prescribed position in the vehicle) of the point of sight P of the camera 12 and the image-taking direction (the line of sight) K. Then, the camera control part 104 generates a ground projection image 530 by projecting the taken image 510 on the ground surface 520 in the image-taking direction K from the position of the point of sight P of the camera 12. Here, the image-taking direction K intersects the taken image 510 perpendicularly at its center. Further, the distance from the point of sight P of the camera 12 to the taken image 510 is determined previously. The thus-generated ground projection image 530 is like a bird's-eye view of an area in the neighborhood of the vehicle seen from the sky over the vehicle.

The vehicle-mounted network communication unit 13 connects the navigation device 100 with a network (not shown) supporting a vehicle control network standard such as CAN or the like, and performs communication with an Electronic Control Unit (ECU) as another vehicle control unit connected with the network, by sending and receiving CAN messages to and from the ECU.

Figure 5:
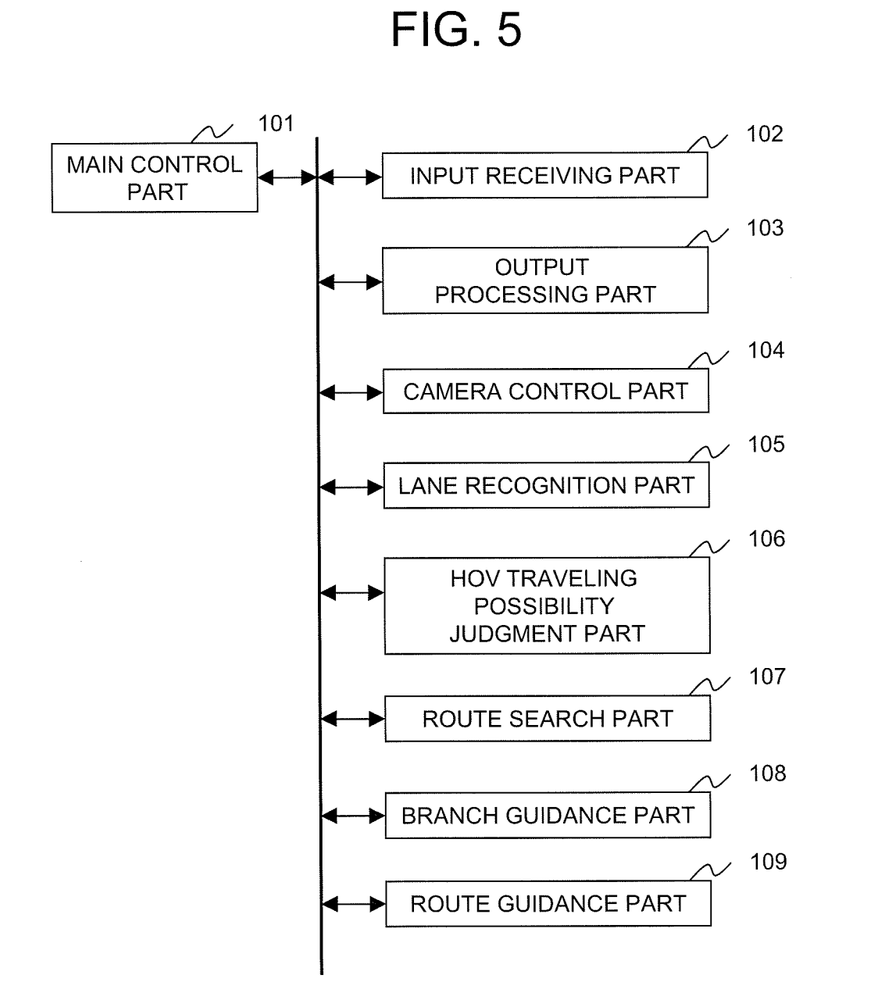
FIG. 5 is a functional block diagram showing a processing part.

FIG. 5 is a functional block diagram showing the processing part 1. As shown in the figure, the processing part 1 comprises a main control part 101, an input receiving part 102, an output processing part 103, the camera control part 104, a lane recognition part 105, an HOV traveling possibility judgment part 106, a route search part 107, a branch guidance part 108, and a route guidance part 109.

The main control part 101 is a central functional part that performs various types of processing. The main control part 101 controls other processing parts depending on a content of processing. Further, the main control part 101 obtains information from various sensors, the GPS receiver 9 and the like, and performs map matching processing and the like to identify the current location. Further, at an appropriate time, the main control part 101 associates the date and time of traveling with the location, to record in the storage unit 3 a traveling history for each link. Further, in response to a request from each processing part, the main control part 101 outputs the current time. Also, the main control part 101 manages various types of setting information held in the navigation device 100. That is to say, from the user, the main control part 101 receives information to be set as the various types of setting information, through the input receiving part 102, and stores the received information in a prescribed position of the storage unit 3. Among the various types of setting information, the main control part 101 receives information on use of an HOV lane (for example, information set as either "true" or "false" as to whether an HOV lane are to be used positively), and stores the received information in the storage unit 3. When the main control part 101 receives, from another control part, a request for providing the various types of setting information, the main control part 101 provides the various types of setting information to the control part that has sent the request.

The input receiving part 102 receives an instruction inputted from the user through the input unit 5 or the microphone 41, and controls each part of the processing part 1 so that processing corresponding to the content of the request is performed. For example, in the case where the user requests a search for a recommended route, the input receiving part 102 requests the output processing part 103 to perform processing for displaying a map for setting a destination on the display 2.

The output processing part 103 receives screen information to display (such as polygon information, for example), converts the received information into a signal so that the information can be drawn on the display 2, and instructs the display 2 to perform drawing.

The camera control part 104 controls operation of the camera 12. For example, the camera control part 104 sets timing of start and end of taking an image by the camera 12. Further, the camera control part 104 controls sending of the taken image to the lane recognition part 105.

The lane recognition part 105 obtains an image (as image data) taken by the camera 12, and converts the obtained image to an image for displaying (a ground projection image). Further, from the obtained image, the lane recognition part 105 recognizes marks and the like laid or colored on the road surface, to identify the lane in which the vehicle is traveling. For example, as described later, when the lane recognition part 105 recognizes existence of, for example, a mark (a diamond painting) indicating an HOV lane nearly at the center in the width direction of the image, then the lane recognition part 105 judges that the vehicle 300 is traveling in an HOV lane. Or, when the lane recognition part 105 recognizes the mark not nearly at the center in the width direction of the image but in a position closer to the right or left side and additionally the mark is on the edge side of the image beyond a lane mark seen from the vicinity of the center, then the lane recognition part 105 judges that the vehicle is traveling not in an HOV lane but in the lane adjacent to an HOV lane.

The HOV traveling possibility judgment part 106 judges whether the vehicle 300 is allowed to travel in an HOV lane or not. In judging the traveling possibility, the HOV traveling possibility judgment part 106 makes judgment, through the vehicle-mounted network communication unit 013, on the type and the like of the vehicle 300 on the basis of communication information flowing through the vehicle-mounted network of the vehicle 300, to judge whether the vehicle is of the type that is allowed to travel in an HOV lane. Of course, the judgment of traveling possibility is not limited to this. For example, the HOV traveling possibility judgment part 106 may identify the number of passengers by means of a load sensor (not shown) attached on each seat of the vehicle or by means of seat belt wearing sensors, to judge whether the number of passengers reaches the required number for traveling in an HOV lane.

The route search part 107 searches for the optimum route (recommended route) that connects the departure place designated by the user or the current location to the destination. In performing the route search, route search logic such as the Dijkstra's algorithm is employed to search for a route on the basis of a link cost previously set to each specific section (i.e. link) of roads. In this processing, the route search part 107 requests the HOV traveling possibility judgment part 106 to judge whether the vehicle is in a condition possible for traveling in an HOV lane. If an obtained judgment result shows that the vehicle is in a condition possible for traveling in an HOV lane, the search for a recommended route is performed by giving priority to a route using an HOV lane. If the vehicle is not in a condition possible for traveling in an HOV lane, the route search part 107 searches for a route for which the link cost is least, without considering an HOV lane. In this processing, if the vehicle is already traveling in an HOV lane although it is judged that the vehicle is not in a condition possible for traveling in the HOV lane, the route search part 107 searches for a recommended route by giving priority to a route using the HOV lane. In judging whether the vehicle is already traveling in an HOV lane or not, the route search part 107 refers to the HOV attribute 228 of the link to which the current location belongs. If the HOV attribute 228 is "exclusive", the route search part 107 judges that the vehicle is traveling in an HOV lane. If the HOV attribute 228 is "none", the route search part 107 judges that the vehicle is not traveling in an HOV lane. And, if the HOV attribute 228 is "shared", the route search part 107 makes the judgment by requesting the lane recognition part 105 to judge whether the traveling lane is an HOV lane or not.

The branch guidance part 108 guides the user about existence and location of a merging point with another road, a branch to another road or the like, by using image or voice. For example, before a merging location of a branch line with a main line of, for example, an expressway, the branch guidance part 108 outputs a display informing the user that the merging point is coming closer or informing the user of the approximate distance to the merging point, to the display 2 through the output processing part 103. Further, at a branch point from a main line to a ramp of an expressway, the branch guidance part 108 informs the user which lane the vehicle should travel in, by voice through the speaker 42.

The route guidance part 109 guides the user by using the speaker 42 and/or the display 2 so that the current location of the vehicle does not deviate from the recommended route.

The above-described functional parts of the processing part 1, namely, the main control part 101, the input receiving part 102, the output processing part 103, the camera control part 104, the lane recognition part 105, the HOV traveling possibility judgment part 106, the route search part 107, the branch guidance part 108 and the route guidance part 109, are each realized when the CPU 21 reads and executes a prescribed program. To that end, the RAM 22 stores the program for realizing processing of each functional part.

The above-described components are results of component classification of the navigation device 100 according to main contents of processing, in order to make it easy to understand the configuration of the navigation device 100. Thus, the way of classification of components and their names do not restrict the present invention. The components of the navigation device 100 can be classified into a larger number of components according to contents of processing. Or, it is possible to classify components such that each component performs more contents of processing.

Further, each functional part may be realized by hardware (such as ASIC or GPU). Further, processing of each functional part may be performed by one hardware unit or by a plurality of hardware units.

[Description of Operation]

Figure 6:
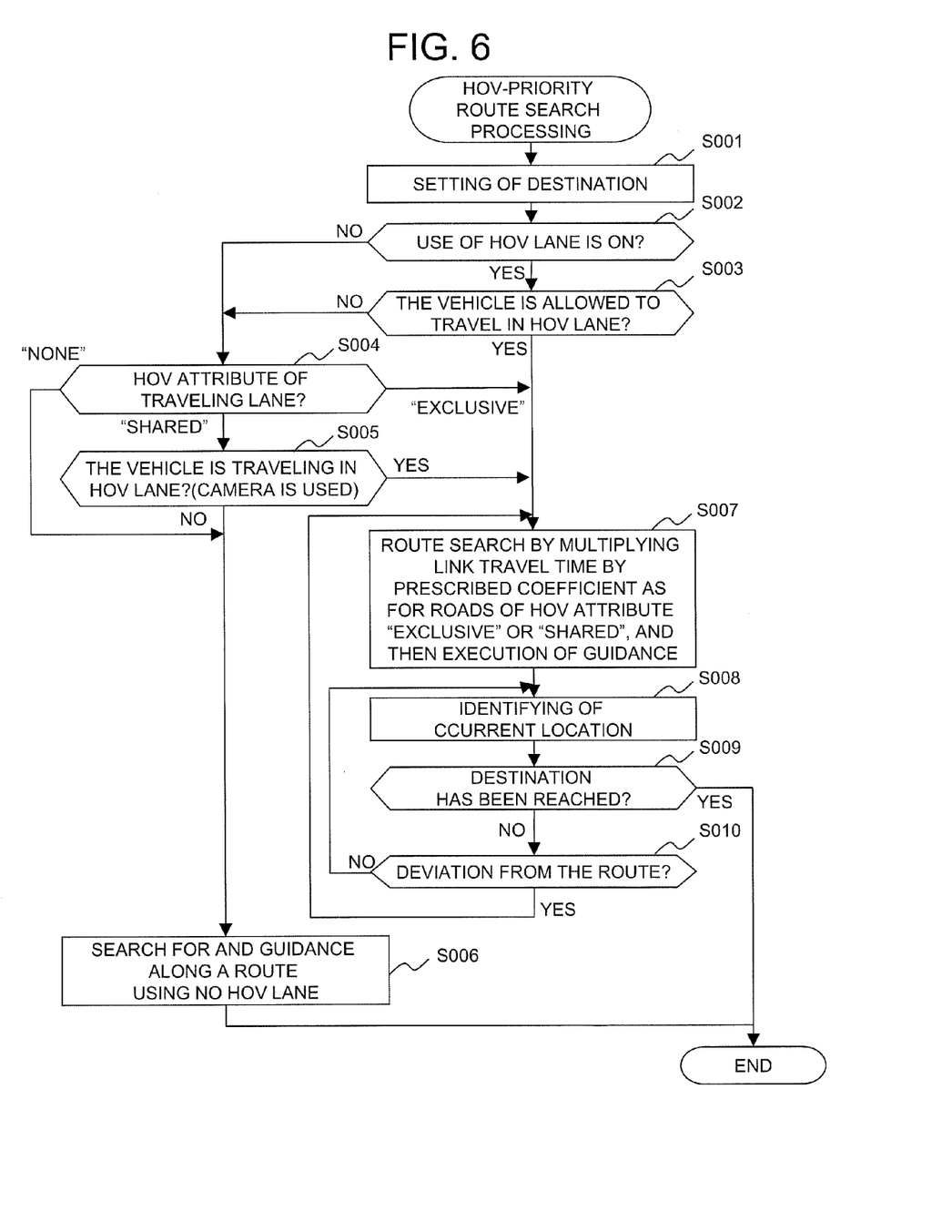
FIG. 6 is a flowchart showing HOV-priority route search processing.

Next, operation of HOV-priority route search processing performed by the navigation device 100 will be described. FIG. 6 is a flowchart showing the HOV-priority route search processing performed by the navigation device 100. This flow is started when designation of a destination together with an instruction to perform a search for a recommended route is received from the user in a state that the navigation device 100 is operating.

First, the route search part 107 sets a destination (Step S001). In detail, the route search part 107 sets, as a destination of route search, a destination received through the main control part 101 of the navigation device 100.

Next, the route search part 107 judges whether the navigation device 100 is set to use an HOV lane or not (Step S002). In detail, among the various type of setting information held by the navigation device 100, the route search part 107 obtains information on use of an HOV lane (for example, information set as either "true" or "false" as to whether an HOV lane are to be used) from the main control part 101. Then, by referring to the obtained information, the route search part 107 judges whether the navigation device 100 is set to use an HOV lane or not.

If the navigation device 100 is set to use an HOV lane ("Yes" in Step S002), the route search part 107 judges whether the vehicle is allowed to travel in an HOV lane or not (Step S003). In detail, the route search part 107 requests the HOV traveling possibility judgment part 106 to judge whether the vehicle is allowed to travel in an HOV lane.

If the navigation device 100 is not set to use an HOV lane ("No" in Step S002), or if the vehicle is not allowed to travel in an HOV lane ("No" in Step S003), the route search part 107 obtains the HOV attribute 228 of the lane in which the vehicle is traveling, to judge whether the vehicle is traveling in an HOV lane or not (Step S004).

If the HOV attribute of the traveling lane is "exclusive", the route search part 107 advances the processing to the below-described Step S007, to perform a route search giving priority to an HOV lane. If the HOV attribute of the traveling lane is "none", the route search part 107 advances the processing to the below-described Step S006, to perform a route search without using an HOV lane. If the HOV attribute of the traveling lane is "shared", then the lane recognition part 105 judges whether the vehicle is traveling in an HOV lane or not by using an image taken by the camera 12 (Step S005).

If it is judged, by using the image taken by the camera 12, that the vehicle is traveling in an HOV lane ("Yes" in Step S005), the route search part 107 advances the processing to the below-described Step S007, to perform a route search giving priority to an HOV lane.

If it is judged, by using the image taken by the camera 12, that the vehicle is not traveling in an HOV lane ("No" in Step S005), the route search part 107 advances the processing to the below-described Step S006, to perform a route search without using an HOV lane.

If the HOV attribute of the traveling lane is "none" ("none" in Step S004), or if it is judged, by using the image taken by the camera 12, that the vehicle is not traveling an HOV lane ("No" in Step S005), then the route search part 107 performs a route search without using an HOV lane, and performs guidance along the retrieved route (Step S006). In detail, the route search part 107 specifies a link cost of each link irrespective of the value of the HOV attribute 228 of that link, performs a search for a route from the departure place (or the current location) to the destination set in Step S001, and sets a favorable-cost route (for example, the least-cost route) as a recommended route. Then, the route guidance part 109 guides the user along the recommended route.

If the vehicle is allowed to travel in an HOV lane ("Yes" in Step S003), or the lane in which the vehicle is traveling is an HOV lane ("exclusive" in Step S004 or "Yes" in Step S005), the route search part 107 searches for a route that gives priority to traveling in an HOV lane, and performs guidance along the retrieved route. In detail, as for a link whose HOV attribute 228 is "exclusive" or "shared" (i.e. a road including an HOV lane), the route search part 107 performs a route search by using a value obtained by multiplying a link cost (for example, a link travel time) by a prescribed coefficient (for example, a prescribed value such as "0.7") (Step S007).

When guidance along the route is started, the route search part 107 identifies the current location (Step S008), and judges whether the vehicle has arrived at the destination or not (Step S009). If the vehicle has arrived at the destination ("Yes" in S009), the route search part 107 ends the HOV-priority route search processing. If the vehicle has not arrived at the destination ("No" in S009), the route search part 107 judges whether the current location is deviated from the recommended route or not (Step S010). If the current location is not deviated from the recommended route ("No" in Step S010), the route search part 107 returns the processing to Step S008. If the current location is deviated from the recommended route ("Yes" in step S010), the route search part 107 return the processing to Step S007, to search for a recommended route again.

Figure 7A:
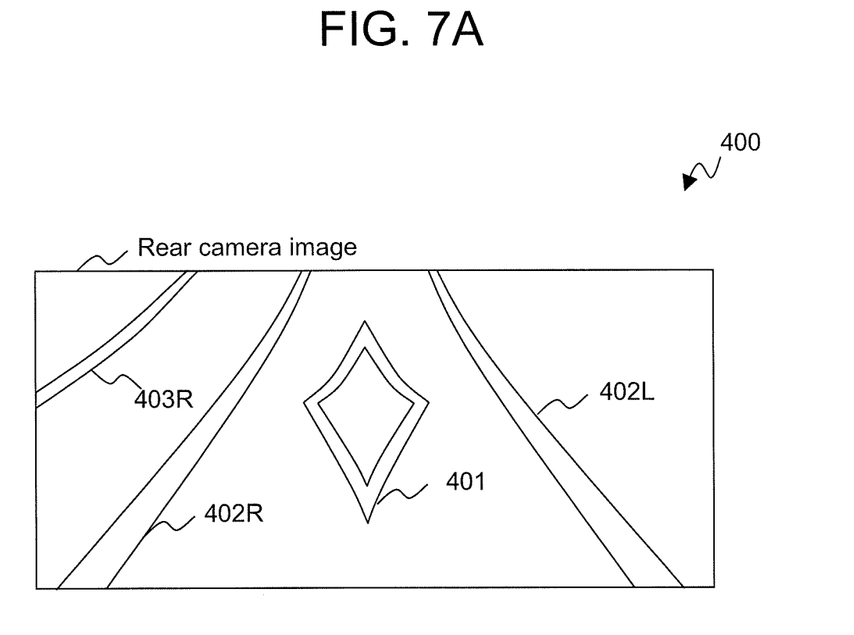
FIGS. 7A and 7B are views showing a principle of processing for recognizing a traveling lane.

FIGS. 7A and 7B are views showing an example of processing in which the lane recognition part 105 performs judgment of the lane in Step S005. If the image taken by the camera control part 104 is as shown in FIG. 7A, then the lane recognition part 105 judges that the vehicle 300 is traveling in an HOV lane. In detail, the image 400 shows an HOV lane indication mark 401, a left lane line 402L, a right lane line 402R, and an outside right lane line 403R. The camera position is between the left lane line 402L and the right lane line 402R, and thus it is judged that the vehicle is traveling in a lane positioned between the left lane line 402L and the right lane line 402R. On the other hand, the HOV lane mark 401 shows up between the left lane line 402L and the right lane line 402R, and thus it is said that the HOV lane mark 401 is a sign painted on the lane in which the vehicle is traveling. Thus, the lane recognition part 105 judges that the vehicle is traveling in an HOV lane.

Figure 7B:
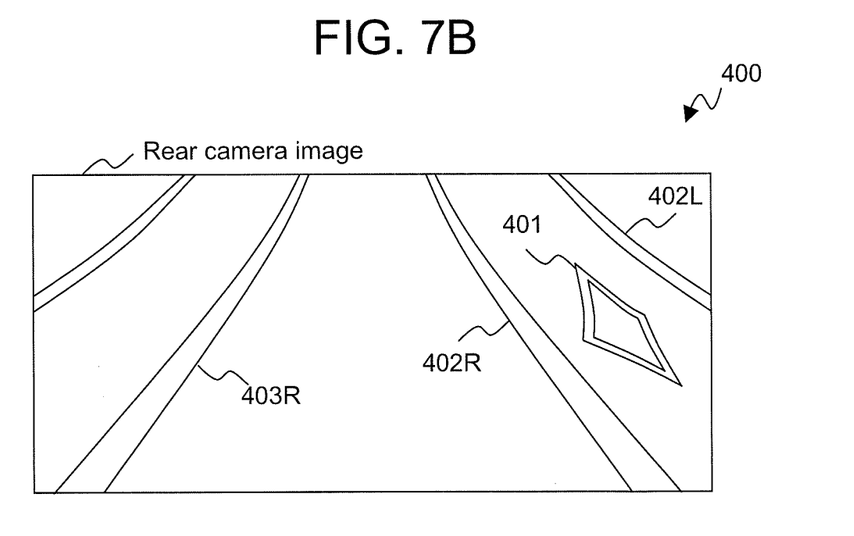

If the image taken by the camera control part 104 is as shown in FIG. 7B, then the lane recognition part 105 judges that the vehicle 300 is not traveling in an HOV lane. In detail, similarly to FIG. 7A, the image shows the HOV lane indication mark 401, a left lane line 402L, a right lane line 402R, and an outside right lane line 403R. However, the camera position is between the right lane line 402R and the outside right lane line 403R, and thus it is judged that the vehicle is traveling in a lane positioned between the right lane line 402R and the outside right lane line 403R. Since the HOV lane indication mark 401 is shown between the left lane line 402L and the right lane line 402R, it is a sign painted on a different lane from the lane in which the vehicle is traveling. Thus, the lane recognition part 105 judges that the vehicle is not traveling in an HOV lane.

Hereinabove, the content of the HOV-priority route search processing has been described. By performing the above-described HOV-priority route search processing, the navigation device 100 can perform a search by giving priority to a route that uses an HOV lane, if the situation allows use of an HOV lane. Thus, the navigation device 100 can perform guidance preferentially along a route that uses an HOV lane.

In the above-described processing, it is judged whether the vehicle is allowed to travel in an HOV lane, just after setting a destination. The invention, however, is not limited to this. For example, when opening and closing of a door of the vehicle 300 is detected during route guidance, there is a possibility of a change in the number of passengers. In that case, it may be judged once again whether traveling in an HOV lane is possible or not.

Figure 8:
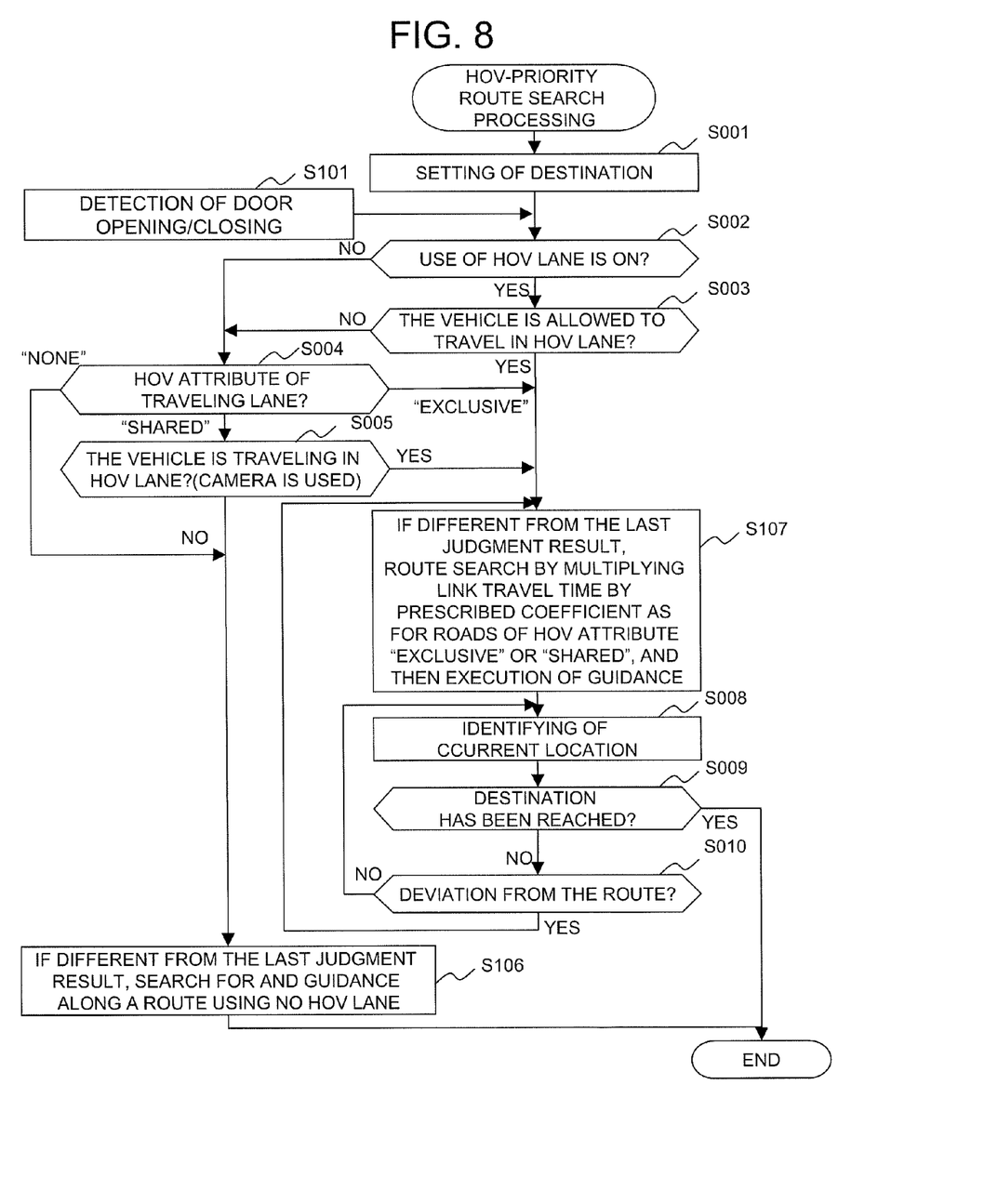
FIG. 8 is a flowchart showing a variation of HOV-priority route search processing.

FIG. 8 is a flowchart showing a detailed content of such HOV-priority route search processing. Processing in Steps S001-S005 and Steps S008-S010 is similar to the processing of the HOV-priority route search processing shown in FIG. 6, and thus its description is omitted.

As a different point from the HOV-priority route search processing shown in FIG. 6, the route search part 107 interrupts the HOV-priority route search processing to start the control from Step S002, when opening and closing of a vehicle's door is detected, (Step S101). In detail, the route search part 107 judges, through the vehicle-mounted network communication unit 13, whether information showing closing of a vehicle's door has flowed through the vehicle-mounted network within a prescribed time period (within a time elapsed from the last current time identifying processing). And, when it is detected that information indicating closing of a door has flowed through the vehicle-mounted network, the route search part 107 performs Step S101, to make an interrupt.

When opening and closing of a door is not detected, the route search part 107 does not interrupt the HOV-priority route search processing, and continues the HOV-priority route search processing.

Further, in Step S106 of FIG. 8 which corresponds to Step S006 of FIG. 6, the route search part 107 performs the following processing. That is to say, in the case where the processing of Steps S002-S005 performed after interruption leads to guidance along a route without using an HOV lane differently from the last judgment result, the route search part 107 searches for a route without using an HOV lane, and performs guidance along the retrieved route (Step S106).

Further, in Step S107 of FIG. 8 which corresponds to Step S007 of FIG. 6, the route search part 107 performs the following processing. That is to say, in the case where the processing of Steps S002-S005 performed after interruption leads to guidance along a route using an HOV lane differently from the last judgment result, the search part 107 searches for a route that preferentially use an HOV lane and performs guidance along the retrieved route (Step S107).

Hereinabove, has been described the content of the HOV-priority route search processing, in which it is judged again whether the vehicle 300 is allowed to travel in an HOV lane, when opening and closing of a door of the vehicle 300 is detected in the course of route guidance. By so doing, it is possible to judge anew whether it is allowed to travel in an HOV lane if there is a possibility that the number of passengers has changed. Thus, for example in the case where the number of passengers decreases to be less than the prescribed number, it is possible to control use of an HOV lane suitably. Here, in each of Steps S106 and S107, re-search is performed in the case where there is a difference from the last judgment result. However, the present invention is not limited to this, and it is possible to perform a search again even if there is no difference from the last judgment result.

Hereinabove, the first embodiment of the present invention has been described. According to the first embodiment of the present invention, the navigation device 100 can give guidance preferentially along a route using an HOV lane if conditions for using an HOV lane are satisfied.

The present invention is not limited to the above-described first embodiment, and the above-described embodiment can be varied variously within the spirit and scope of the invention. For example, as for the lane recognition processing by the lane recognition part 105, the lane recognition may be performed on the basis of high-precision location information of GPS or information received from oscillators laid on each lane for lane recognition.

Hereinabove, the present invention has been described centering on embodiments. In the above embodiments, examples of applying the invention to a navigation device have been described. However, the present invention is not limited to a navigation device, and can be generally applied to a device that performs route guidance for a moving body.

The invention claimed is:

1. A navigation device, comprising:
a storage unit adapted to store lane information including information on a setting-up state of a conditional lane that is available for traveling when prescribed conditions are satisfied;
an image capturing unit; and
a processor adapted to search for a recommended route from a current position to a destination;
wherein the processor
determines whether the navigation device is set for use of the conditional lane, and, when the navigation device is set for use of the conditional lane, determines whether the vehicle is allowed to travel in the conditional lane;
when the navigation device is not set for use of the conditional lane or the vehicle is not allowed to travel in the conditional lane, determines whether an attribute of the conditional lane is none, shared, or exclusive;
when the attribute of the conditional lane is shared, judges, based on an image of surroundings of the vehicle equipped with the navigation device captured by the image capturing unit that the vehicle is driving in the conditional lane; and
when the attribute of the conditional lane is exclusive or the vehicle is driving in the conditional lane, searches for, as the recommended route, a route which contains a first road section consisting only of the conditional lane or a second road section consisting of both a normal lane and the conditional lane when the processor has judged that a vehicle equipped with the navigation device is driving in the conditional lane based on an image of surroundings of the vehicle captured by the image capturing unit.

2. A navigation device according to claim 1, wherein: the processor sets a cost of the first road section consisting only of the conditional lane or the second road section consisting of both the normal lane and the conditional lane to a lower value, and performs a route search to the destination on a basis of a total cost necessary to reach the destination.

3. A navigation device according to claim 2, wherein: the processor sets the cost of the first road section consisting only of the conditional lane or the second road section consisting of both the normal lane and the conditional lane to a lower value according to previously-determined criteria.

4. A navigation device according to claim 1, wherein: the processor judges that the vehicle equipped with the navigation device is driving in the conditional lane when an image captured by the image capturing unit shows that there is a pattern indicative of an HOV lane on the lane the vehicle is driving.

5. A navigation device according to claim 1, wherein:
the navigation device further comprises a door opening-closing detection unit that detects opening and closing of a door of the vehicle mounted with the navigation device; and
the processor makes again a judgment about allowableness of traveling in the conditional lane, if the door opening-closing detection unit detects opening-closing of the door and searches again for a route on a basis of a judgment result of the judgment about allowableness of traveling in the conditional lane.

6. A method of route search of a navigation device, wherein:
the navigation device comprises:
a storage unit adapted to store lane information including information on a setting-up state of a conditional lane that is available for traveling by a vehicle when prescribed conditions are satisfied;
an image capturing unit; and
a processor adapted to search for a recommended route from a current position to a destination;
wherein the processor carries out the method, comprising:
a step of determining whether the navigation device is set for use of the conditional lane, and, when the navigation device is set for use of the conditional lane, determining whether the vehicle is allowed to travel in the conditional lane;
when the navigation device is not set for use of the conditional lane or the vehicle is not allowed to travel in the conditional lane, a step of determining whether an attribute of the conditional lane is none, shared, or exclusive;
when the attribute of the conditional lane is shared, a step of judging, based on an image of surroundings of the vehicle equipped with the navigation device captured by the image capturing unit, that the vehicle is driving in the conditional lane; and
when the attribute of the conditional lane is exclusive or the vehicle is driving in the conditional lane, a step of searching for, as the recommended route, a route which contains a first road section consisting only of the conditional lane or a second road section consisting of both a normal lane and the conditional lane when the processor has judged that the vehicle is driving in the conditional lane.

7. The method of route search of a navigation device according to claim 6, wherein:
the processor sets a cost of the first road section consisting only of the conditional lane or the second road section consisting of both the normal lane and the conditional lane to a lower value, and performs a route search to the destination on a basis of a total cost necessary to reach the destination.

8. The method of route search of a navigation device according to claim 6, wherein:
the processor sets the cost of the first road section consisting only of the conditional lane or the second road section consisting of both the normal lane and the conditional lane to a lower value according to previously-determined criteria.

9. The method of route search of a navigation device according to claim 6, wherein:
the processor judges that the vehicle equipped with the navigation device is driving in the conditional lane when an image captured by the image capturing unit shows that there is a pattern indicative of an HOV lane on the lane the vehicle is driving.

10. The method of route search of a navigation device according to claim 6, wherein:
the navigation device further comprises a door opening-closing detection unit that detects opening and closing of a door of the vehicle mounted with the navigation device; and the processor makes again a judgment about allowableness of traveling in the conditional lane, if the door opening-closing detection unit detects opening-closing of the door and searches again for a route on a basis of a judgment result of the judgment about allowableness of traveling in the conditional lane.

* * * * *